(12) United States Patent
Park et al.

(10) Patent No.: US 10,884,922 B2
(45) Date of Patent: Jan. 5, 2021

(54) STORAGE DEVICE AND METHOD OF OPERATING THE SAME

(71) Applicant: SK hynix Inc., Gyeonggi-do (KR)

(72) Inventors: Jong Ju Park, Gyeonggi-do (KR); Gi Pyo Um, Gyeonggi-do (KR); Gun Wook Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/207,487

(22) Filed: Dec. 3, 2018

(65) Prior Publication Data
US 2019/0354476 A1 Nov. 21, 2019

(30) Foreign Application Priority Data

May 18, 2018 (KR) .......................... 10-2018-0056863

(51) Int. Cl.
*G06F 3/06* (2006.01)
*G06F 12/02* (2006.01)

(52) U.S. Cl.
CPC ........ *G06F 12/0253* (2013.01); *G06F 3/0604* (2013.01); *G06F 3/0655* (2013.01); *G06F 3/0679* (2013.01); *G06F 2212/7205* (2013.01)

(58) Field of Classification Search
CPC ..... G06F 3/0655; G06F 12/0253–0269; G06F 2212/7205
See application file for complete search history.

(56) References Cited

U.S. PATENT DOCUMENTS

| 9,436,595 | B1* | 9/2016 | Benitez | G06F 12/0246 |
| 2006/0161724 | A1* | 7/2006 | Bennett | G06F 12/0246 711/103 |
| 2007/0260811 | A1* | 11/2007 | Merry, Jr. | G06F 12/0246 711/103 |
| 2007/0260837 | A1* | 11/2007 | Hsu | G06F 12/1441 711/163 |
| 2009/0106519 | A1* | 4/2009 | Lin | G06F 3/0614 711/167 |

(Continued)

FOREIGN PATENT DOCUMENTS

| KR | 1020170071085 | 6/2017 |
| KR | 1020170099018 | 8/2017 |

OTHER PUBLICATIONS

Xiao-Yu Hu, Robert Haas, Eleftheriou Evangelos, "Container Marking: Combining Data Placement, Garbage Collection and Wear Levelling for Flash", 2011 IEEE 19th Annual International Symposium on Modelling, Analysis, and Simulation of Computer and Telecommunication Systems. (Year: 2011).*

(Continued)

*Primary Examiner* — Khoa D Doan
(74) *Attorney, Agent, or Firm* — IP & T Group LLP

(57) ABSTRACT

Provided herein may be a storage device and a method of operating the same. The storage device may include a memory device including a plurality of memory blocks, and a memory controller configured to control the memory device and perform a garbage collection operation of securing free blocks in which data is not stored, based on a sum of a number of invalid data blocks and a number of free blocks, among the plurality of memory blocks, wherein the number of invalid data blocks is determined depending on a size of invalid data stored in the plurality of memory blocks.

20 Claims, 12 Drawing Sheets

(56) References Cited

U.S. PATENT DOCUMENTS

| | | | | |
|---|---|---|---|---|
| 2009/0198952 A1* | 8/2009 | Khmelnitsky | ...... | G06F 12/0246 |
| | | | | 711/206 |
| 2010/0082890 A1* | 4/2010 | Heo | ...... | G06F 12/0246 |
| | | | | 711/103 |
| 2010/0325351 A1* | 12/2010 | Bennett | ...... | G06F 12/0246 |
| | | | | 711/103 |
| 2014/0185376 A1* | 7/2014 | Sinclair | ...... | G11C 11/5628 |
| | | | | 365/185.03 |
| 2016/0011818 A1* | 1/2016 | Hashimoto | ...... | G11C 16/3495 |
| | | | | 711/103 |
| 2017/0052719 A1* | 2/2017 | Boitei | ...... | G06F 3/0619 |
| 2018/0088805 A1* | 3/2018 | Kanno | ...... | G06F 3/061 |
| 2018/0373629 A1* | 12/2018 | Kim | ...... | G06F 12/0253 |

OTHER PUBLICATIONS

M. Yang, Y. Chang, Y. Kuan and C. Tsao, "Graceful Space Degradation: An Uneven Space Management for Flash Storage Devices," in IEEE Transactions on Computer-Aided Design of Integrated Circuits and Systems, vol. 35, No. 9, pp. 1425-1434, Sep. 2016, doi: 10.1109/TCAD.2015.2512902. (Year: 2016).*

* cited by examiner

STORAGE DEVICE AND METHOD OF OPERATING THE SAME

CROSS-REFERENCE TO RELATED APPLICATION

The present application claims priority under 35 U.S.C. § 119(a) to Korean patent application number 10-2018-0056863, filed on May 18, 2018, which is incorporated herein by reference in its entirety.

BACKGROUND

1. Field of Invention

Various embodiments of the present disclosure generally relate to an electronic device. Particularly, the embodiments relate to a storage device and a method of operating the storage device.

2. Description of Related Art

A storage device is a device which stores data under the control of a host device such as a computer, a smartphone, or a smartpad. Examples of the storage device include a device such as a hard disk drive (HDD) which stores data in a magnetic disk, and a device such as a solid state drive (SSD) or a memory card which stores data in a semiconductor memory, particularly, a nonvolatile memory, according to the device in which data is stored.

The storage device may include a memory device in which data is stored and a memory controller which controls the storage of data in the memory device. The memory device may be classified into a volatile memory and a nonvolatile memory. Representative examples of the nonvolatile memory include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc.

SUMMARY

Various embodiments of the present disclosure are directed to a storage device which performs an improved garbage collection operation, and a method of operating the storage device.

An embodiment of the present disclosure may provide for a storage device. The storage device may include a memory device including a plurality of memory blocks, and a memory controller configured to control the memory device and perform a garbage collection operation of securing free blocks in which data is not stored, based on a sum of a number of invalid data blocks and a number of free blocks, among the plurality of memory blocks, wherein the number of invalid data blocks is determined depending on a size of invalid data stored in the plurality of memory blocks.

An embodiment of the present disclosure may provide for a storage device. The storage device may include a memory device including a plurality of memory blocks, and a memory controller configured to provide an alarm signal to an external host depending on any one of a number of free blocks in which data is not stored and a number of grown bad blocks that are bad blocks occurring as the memory device is used, among the memory blocks.

An embodiment of the present disclosure may provide for a method of operating a memory controller, the memory controller controlling a memory device including a plurality of memory blocks. The method may include, when a number of free blocks in which data is not stored, among the plurality of memory blocks, is less than a reference number of free blocks, performing a garbage collection operation of securing the free blocks, and when the number of free blocks is less than a first threshold value less than the reference number of free blocks, outputting an urgent alarm signal indicating that it is a time to secure the free blocks.

An embodiment of the present disclosure may provide for a memory system. The memory system may include a plurality of memory blocks and a controller configured to control the memory device to perform a garbage collection operation to the memory blocks determine a number of potential free blocks based on a size of invalid data currently stored in the memory blocks and prevent the memory device from performing the garbage collection operation and a write operation to the memory blocks based on the number of potential free blocks and a number of current free blocks.

DETAILED DESCRIPTION

Figure 1:
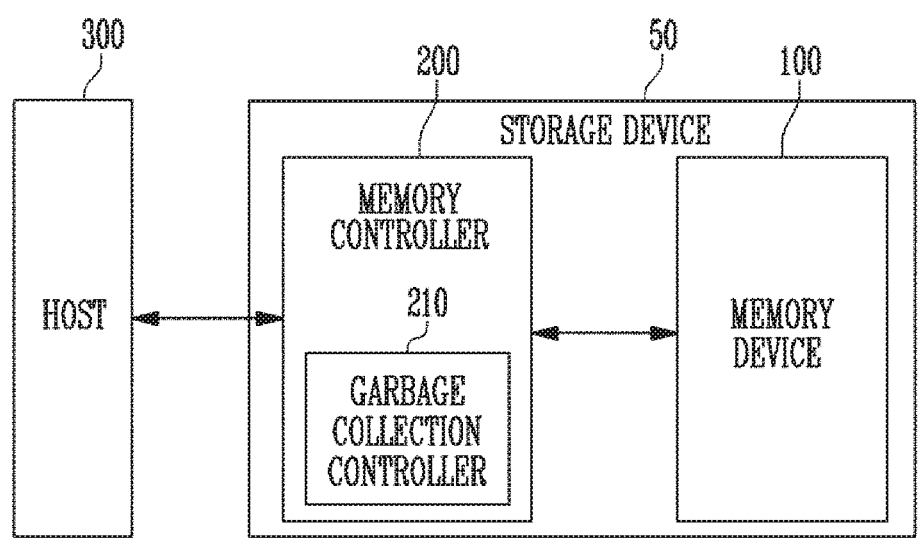
FIG. 1 is a block diagram illustrating a storage device according to an embodiment of the present disclosure.

Specific structural or functional descriptions in the embodiments of the present disclosure introduced in this specification or application are only for description of the embodiments of the present disclosure. The descriptions should not be construed as being limited to the embodiments described in the specification or application.

The present disclosure will be described in more detail based on embodiments. The present disclosure may, however, be embodied in many different forms and should not be construed as being limited to only the embodiments set forth herein, but should be construed as covering modifications, equivalents or alternatives falling within ideas and technical scopes of the present disclosure. This disclosure is not intended to limit the present disclosure to particular modes of practice, and it is to be appreciated that all changes, equivalents, and substitutes that do not depart from the spirit and technical scope of the present disclosure are encompassed in the present disclosure.

It will be understood that, although the terms "first" and/or "second" may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well and vice versa, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Detailed description of functions and structures well known to those skilled in the art will be omitted to avoid obscuring the subject matter of the present disclosure. This aims to omit unnecessary description so as to make the subject matter of the present disclosure clear.

It is noted that reference to "an embodiment" does not necessarily mean only one embodiment, and different references to "an embodiment" are not necessarily to the same embodiment(s).

Various embodiments of the present disclosure will now be described more fully hereinafter with reference to the accompanying drawings, in which preferred embodiments of the present disclosure are illustrated, so that those of ordinary skill in the art can easily carry out the technical idea of the present disclosure.

FIG. 1 is a block diagram illustrating a storage device 50 according to an embodiment of the present disclosure.

Referring to FIG. 1, the storage device 50 may include a memory device 100 and a memory controller 200.

The storage device 50 may be a device which stores data under the control of a host 300. Non-limiting examples of the host 300 may include, for example, a mobile phone, a smartphone, an MP3 player, a laptop computer, a desktop computer, a game console, a television (TV), a tablet PC, or an in-vehicle infotainment system.

The storage device 50 may be manufactured as any one of various types of storage devices depending on a host interface that is a communication scheme with the host 300. For example, the storage device 50 may be implemented as any one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal storage bus (USB) storage device, a universal flash storage (UFS) device, a personal computer memory card international association (PCMCIA) card-type storage device, a peripheral component interconnection (PCI)-card type storage device, a PCI express (PCI-e or PCIe) card-type storage device, a compact flash (CF) card, a smart media card, and a memory stick.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WPP), and wafer-level stack package (WSP).

The memory device 100 may store data. The memory device 100 is operated in response to the control of the memory controller 200. The memory device 100 may include a memory cell array including a plurality of memory cells which store data. The memory cell array may include a plurality of memory blocks. Each memory block may include a plurality of memory cells. A single memory block may include a plurality of pages. In an embodiment, a page may be a unit by which data is stored in the memory device 100 or by which data stored in the memory device 100 is read. A memory block may be a unit by which data is erased.

Memory blocks may be divided into a free block and a data block depending on whether data is stored in each memory block.

The free block may be an empty block in which data is not stored. The data block may be a block in which data is stored. Pieces of data stored in the data block may be classified into valid data and invalid data.

Of the memory blocks, a block in which data cannot be stored may be a bad block. Bad blocks may be classified into a manufacture bad block (MBB), which occurs when the memory device 100 is manufactured, and a grown bad block (GBB), which occurs in a procedure in which each memory block is used over time. When memory blocks in which data is stored are read, a memory block in which an uncorrectable error (i.e. uncorrectable ECC, UECC) occurs may be a grown bad block (GBB).

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a Low Power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM). In the present specification, for convenience of description, a description will be made on the assumption that the memory device 100 is a NAND flash memory.

In an embodiment, the memory device 100 may be implemented as a three-dimensional (3D) array structure. The present disclosure may also be applied not only to a flash memory device in which a charge storage layer is formed of a conductive floating gate (FG), but also to a charge trap flash (CTF) memory device in which a charge storage layer is formed of an insulating layer.

The memory device 100 may receive a command and an address from the memory controller 200, and may access the area of the memory cell array, selected by the address. That is, the memory device 100 performs an operation corresponding to the command on the area selected by the address. For example, the memory device 100 may perform a write operation (i.e., program operation), a read operation, and an erase operation. During a program operation, the memory device 100 may program data to the area selected by the address. During a read operation, the memory device 100 may read data from the area selected by the address. During an erase operation, the memory device 100 may erase data stored in the area selected by the address.

The memory controller 200 may control the operation of the memory device 100 either in response to a request from the host 300 or regardless of the request from the host 300.

For example, the memory controller 200 may control the memory device 100 so that the memory device 100 performs a program operation, a read operation or an erase operation in response to a request from the host 300. During a program operation, the memory controller 200 may provide a program command, a physical address, and data to the memory device 100. During a read operation, the memory controller 200 may provide a read command and a physical address to the memory device 100. During an erase operation, the memory controller 200 may provide an erase command and a physical address to the memory device 100.

In an embodiment, the memory controller 200 may autonomously generate a program command, an address, and data without receiving a request from the host 300, and may transmit the generated command, address, and data to the memory device 100. For example, the memory controller 200 may provide commands, addresses, and data to the memory device 100 so as to perform a program operation for wear leveling and program operations for garbage collection.

The memory controller 200 may further include a garbage collection controller 210.

The garbage collection controller 210 may perform a garbage collection operation. The garbage collection operation may be a background operation performed by the memory controller 200 to secure free blocks. The garbage collection operation may be performed when the number of free blocks is decreased to less than the reference number of free blocks. In detail, the garbage collection operation may be the operation of selecting a victim block from among data blocks, reading valid data stored in the victim block, storing the read valid data in a new free block, and erasing the victim block, thus securing free blocks.

In an embodiment, two or more victim blocks may be selected to perform the garbage collection operation. In an embodiment, the victim blocks may be selected depending on the size of invalid data or valid data included in each data block.

The garbage collection controller 210 may control the performance of the garbage collection operation depending on the states of the memory blocks. Alternatively, the garbage collection controller 210 may provide an alarm signal to the host 300 depending on the states of the memory blocks. The host 300 may determine the status of the storage device 50 based on the alarm signal.

For example, when the number of free blocks included in the memory device 100 is decreased to less than a first threshold value, the garbage collection controller 210 may generate an urgent alarm signal to be provided to the host 300, and may provide the urgent alarm signal to the host 300.

In an embodiment, when the number of grown bad blocks (GBB) included in the memory device 100 is greater than a second threshold value, the garbage collection controller 210 may generate a warning signal to be provided to the host 300, and may provide the warning signal to the host 300.

In an embodiment, when the sum of the number of invalid data blocks, the number being determined on the basis of the size of invalid data included in victim blocks, and the number of free blocks is decreased to less than a third threshold value, the garbage collection controller 210 may suspend the garbage collection operation. In this case, the memory controller 200 may control the storage device 50 to perform only a read operation without further performing a write operation on memory blocks. That is, when the sum of the number of invalid data blocks and the number of free blocks is decreased to less than the third threshold value, the storage device 50 may be operated as a read only memory (ROM).

The memory controller 200 may run firmware (FW) for controlling the memory device 100. When the memory device 100 is a flash memory device, the memory controller 200 may manage firmware such as a flash translation layer (FTL) for controlling communication between the host 300 and the memory device 100. In detail, the memory controller 200 may translate a logical address included in a request from the host 300 into a physical address.

The memory controller 200 may include a buffer memory (not illustrated). In an embodiment, the memory controller 200 may control data exchange between the host 300 and the buffer memory. Alternatively, the memory controller 200 may temporarily store system data for controlling the memory device 100 in the buffer memory. For example, the memory controller 200 may temporarily store data, input from the host 300, in the buffer memory, and may then transmit the data, temporarily stored in the buffer memory, to the memory device 100.

In various embodiments, the buffer memory may be used as a working memory or a cache memory of the memory controller 200. The buffer memory may store codes or commands that are executed by the memory controller 200. Alternatively, the buffer memory may store data that is processed by the memory controller 200. Further, the buffer memory may store a logical-physical address mapping table, which configures mapping relationships between logical addresses and physical addresses. In an embodiment, the buffer memory may be implemented as a DRAM such as a double data rate synchronous dynamic random access memory (DDR SDRAM), a double data rate fourth generation (DDR4) SDRAM, a low power double data rate fourth generation (LPDDR4) SDRAM, a graphics double data rate (GDDR) SDRAM, a low power DDR (LPDDR) SDRAM, or a Rambus DRAM (RDRAM), or as a static RAM (SRAM). In various embodiments, the buffer memory may be included, as a separate DRAM or SRAM, in the storage device 50 without being included in the memory controller 200.

In an embodiment, the memory controller 200 may control at least two memory devices 100. In this case, the memory controller 200 may control the memory devices 100 in an interleaving manner to improve operating performance.

The host 300 may communicate with the storage device 50 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe or PCI-e), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The storage device 50 may be manufactured as any one of various types of storage devices depending on a host interface that is a communication scheme with the host 300. For example, the storage device 50 may be implemented as any one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal storage bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. For example, the storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

Figure 2:
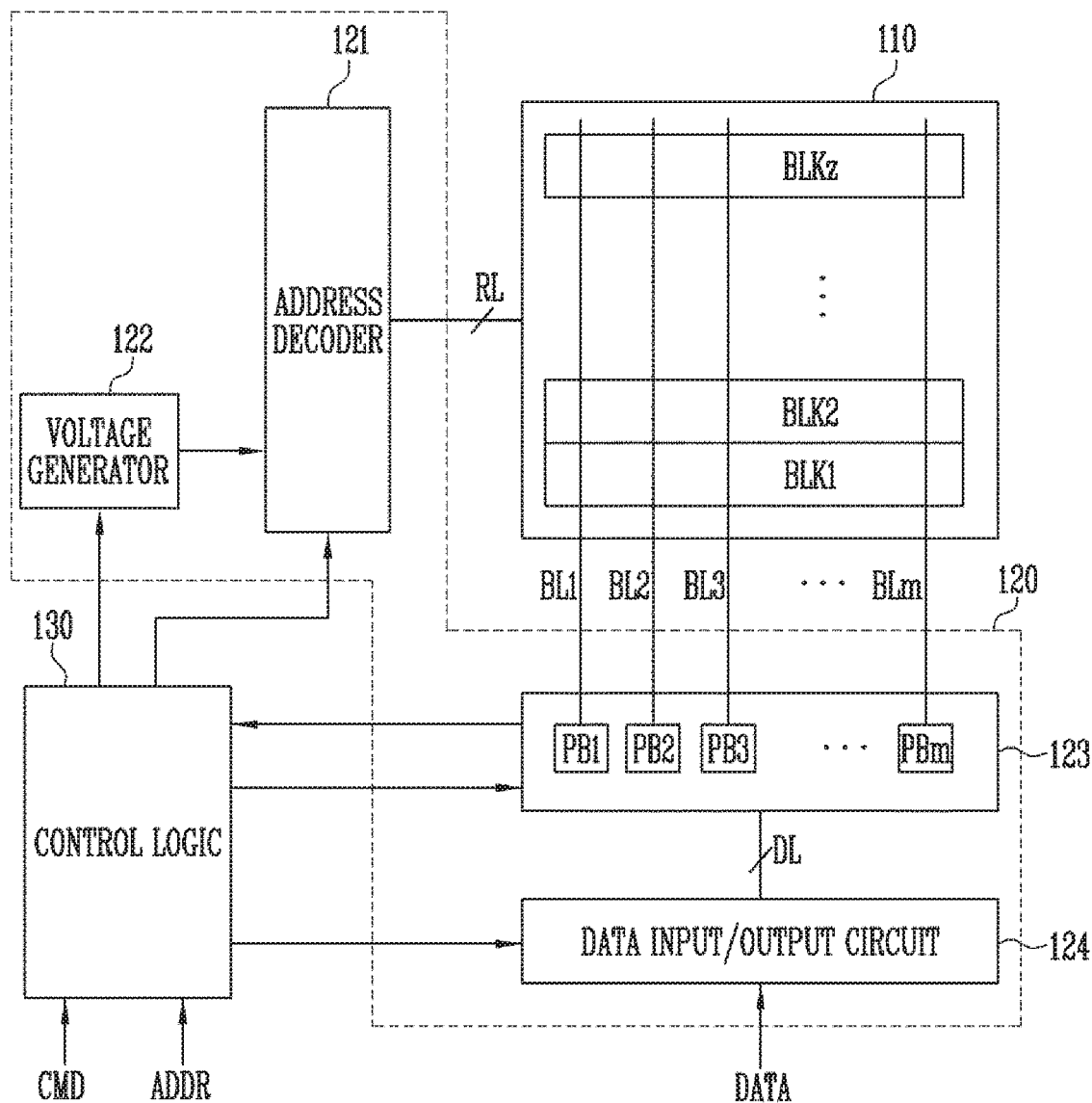
FIG. 2 is a diagram illustrating the structure of a memory device of FIG. 1.

FIG. 2 is a diagram illustrating the structure of the memory device 100 of FIG. 1.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are coupled to an address decoder 121 through row lines RL. The memory blocks BLK1 to BLKz are coupled to a read and write circuit 123 through bit lines BL1 to BLm. Each of the memory blocks BLK1 to BLKz includes a plurality of memory cells. In an embodiment, the plurality of memory cells are nonvolatile memory cells. In the plurality of memory cells, memory cells coupled to the same word line are defined as a single page. That is, the memory cell array 110 is composed of a plurality of pages. In an embodiment, each of the plurality of memory blocks BLK1 to BLKz included in the memory cell array 110 may include a plurality of dummy cells. As the dummy cells, one or more dummy cells may be coupled in series between a drain select transistor and the memory cells and between a source select transistor and the memory cells.

Each of the memory cells of the memory device 100 may be implemented as a single-level cell (SLC) capable of storing a single data bit, a multi-level cell (MLC) capable of storing two data bits, a triple-level cell (TLC) capable of storing three data bits, or a quad-level cell (QLC) capable of storing four data bits.

The peripheral circuit 120 may include the address decoder 121, a voltage generator 122, the read and write circuit 123, and a data input/output circuit 124.

The peripheral circuit 120 may drive the memory cell array 110. For example, the peripheral circuit 120 may drive the memory cell array 110 so that a program operation, a read operation, and an erase operation are performed.

The address decoder 121 is coupled to the memory cell array 110 through row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 121 is configured to be operated under the control of the control logic 130. The address decoder 121 receives the address ADDR from the control logic 130.

The address decoder 121 is configured to decode a block address of the received address ADDR. The address decoder 121 selects at least one memory block from among the memory blocks BLK1 to BLKz in response to the decoded block address. The address decoder 121 is configured to decode a row address of the received address ADDR. The address decoder 121 may select at least one word line of the selected memory block by applying voltages supplied from the voltage generator 122 to at least one word line WL in response to the decoded row address.

During a program operation, the address decoder 121 may apply a program voltage to the selected word line and apply a pass voltage having a level lower than that of the program voltage to unselected word lines. During a program verify operation, the address decoder 121 may apply a verify voltage to a selected word line and apply a verification pass voltage higher than the verify voltage to unselected word lines.

During a read operation, the address decoder 121 may apply a read voltage to a selected word line and apply a pass voltage higher than the read voltage to unselected word lines.

In an embodiment, the erase operation of the memory device 100 may be performed on a memory block basis. During an erase operation, the address ADDR input to the memory device 100 includes a block address. The address decoder 121 may decode the block address and select a single memory block in response to the decoded block address. During the erase operation, the address decoder 121 may apply a ground voltage to word lines coupled to the selected memory block.

In an embodiment, the address decoder 121 may be configured to decode a column address of the received address ADDR. A decoded column address (DCA) may be transferred to the read and write circuit 123. In an exemplary embodiment, the address decoder 121 may include components such as a row decoder, a column decoder, and an address buffer.

The voltage generator 122 is configured to generate a plurality of voltages using an external supply voltage provided to the memory device 100. The voltage generator 122 is operated under the control of the control logic 130.

In an embodiment, the voltage generator 122 may generate an internal supply voltage by regulating the external supply voltage. The internal supply voltage generated by the voltage generator 122 is used as an operating voltage of the memory device 100.

In an embodiment, the voltage generator 122 may generate a plurality of voltages using an external supply voltage or an internal supply voltage. The voltage generator 122 may be configured to generate various voltages required by the memory device 100. For example, the voltage generator 122 may generate a plurality of program voltages, a plurality of pass voltages, a plurality of select read voltages, and a plurality of unselect read voltages.

For example, the voltage generator 122 may include a plurality of pumping capacitors for receiving the internal supply voltage, and may generate a plurality of voltages by selectively activating the pumping capacitors under the control of the control logic 130.

The generated voltages may be supplied to the memory cell array 110 by the address decoder 121.

The read and write circuit 123 includes first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm are operated under the control of the control logic 130.

The first to m-th page buffers PB1 to PBm perform data communication with the data input/output circuit 124. During a program operation, the first to m-th page buffers PB1 to PBm receive data to be stored DATA through the data input/output circuit 124 and data lines DL.

During a program operation, the first to m-th page buffers PB1 to PBm may transfer the data, received through the data input/output circuit 124, to selected memory cells through the bit lines BL1 to BLm when a program pulse is applied to each selected word line. The memory cells in the selected page are programmed based on the transferred data. Memory cells coupled to a bit line to which a program permission voltage (e.g., a ground voltage) is applied may have increased threshold voltages. Threshold voltages of memory cells coupled to a bit line to which a program inhibition voltage (e.g., a supply voltage) is applied may be maintained. During a program verify operation, the first to m-th page buffers may read page data from the selected memory cells through the bit lines BL1 to BLm.

During a read operation, the read and write circuit 123 may read data from the memory cells in the selected page through the bit lines BL, and may output the read data to the data input/output circuit 124.

During an erase operation, the read and write circuit 123 may allow the bit lines BL to float. In an embodiment, the read and write circuit 123 may include a column select circuit.

The data input/output circuit 124 is coupled to the first to m-th page buffers PB1 to PBm through the data lines DL. The data input/output circuit 124 is operated under the control of the control logic 130.

The data input/output circuit 124 may include a plurality of input/output buffers (not illustrated) for receiving input data. During a program operation, the data input/output circuit 124 receives data to be stored DATA from an external controller (not illustrated). During a read operation, the data input/output circuit 124 outputs the data, received from the first to m-th page buffers PB1 to PBm included in the read and write circuit 123, to the external controller.

The control logic 130 may be coupled to the address decoder 121, the voltage generator 122, the read and write circuit 123, and the data input/output circuit 124. The control logic 130 may control the overall operation of the memory device 100. The control logic 130 may be operated in response to a command CMD received from an external device.

Figure 3:
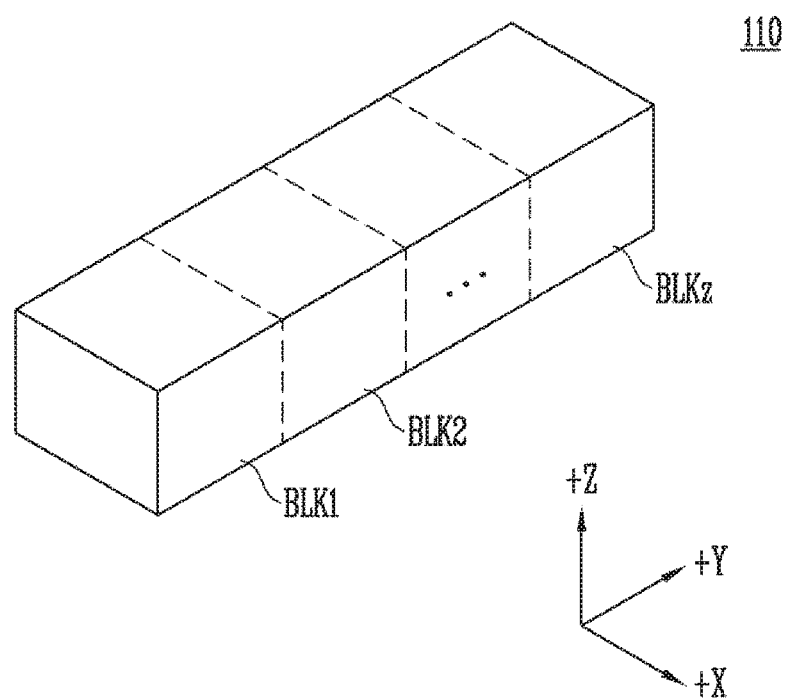
FIG. 3 is a diagram illustrating an embodiment of a memory cell array of FIG. 2.

FIG. 3 is a diagram illustrating an embodiment of the memory cell array of FIG. 2.

Referring to FIG. 3, the memory cell array 110 includes a plurality of memory blocks BLK1 to BLKz. Each memory block may have a three-dimensional (3D) structure. Each memory block includes a plurality of memory cells stacked on a substrate. Such memory cells are arranged in a positive X (+X) direction, a positive Y (+Y) direction, and a positive Z (+Z) direction. The structure of each memory block will be described in detail below with reference to FIGS. 4 and 5.

Figure 4:
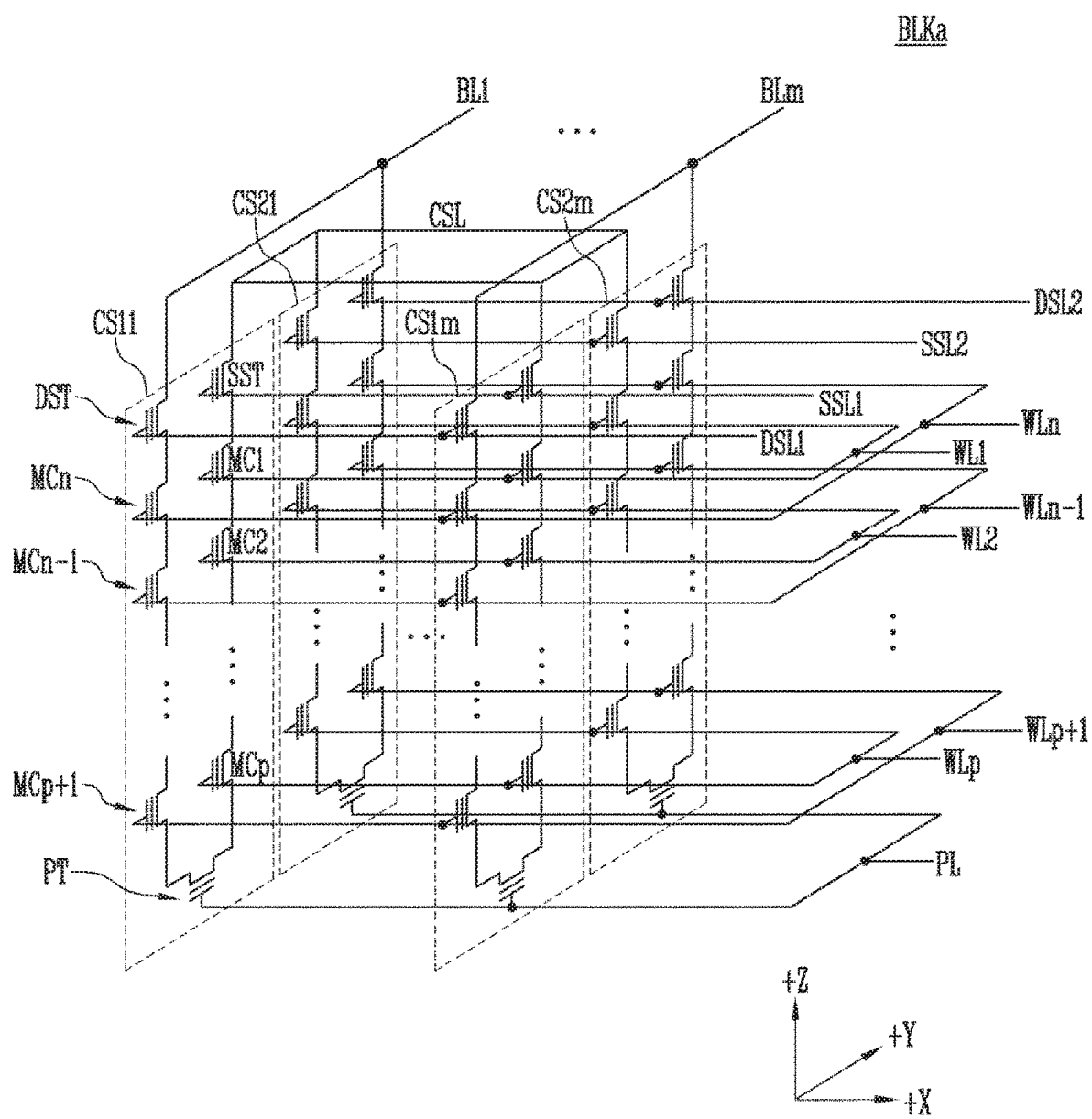
FIG. 4 is a circuit diagram illustrating an example of any one memory block BLKa of memory blocks BLK1 to BLKz of FIG. 3.

FIG. 4 is a circuit diagram illustrating any one memory block BLKa of the memory blocks BLK1 to BLKz of FIG. 3.

Referring to FIG. 4, the memory block BLKa includes a plurality of cell strings CS11 to CS1$m$ and CS21 to CS2$m$. In an embodiment, each of the cell strings CS11 to CS1$m$ and CS21 to CS2$m$ may be formed in a 'U' shape. In the memory block BLKa, m cell strings are arranged in a row direction (i.e. a positive (+) X direction). Although FIG. 4 illustrates two cell strings as being arranged in a column direction (i.e. a positive (+) Y direction), this is merely for ease of description and illustration, and it is to be noted that the present disclosure is not limited thereto. That is, number of cell strings arranged in the column direction may vary depending on design.

Each of the plurality of cell strings CS11 to CS1$m$ and CS21 to CS2$m$ includes at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided to each cell string. In an embodiment, a pillar for providing at least one of the channel layer, the tunneling insulating layer, the charge storage layer, and the blocking insulating layer may be provided to each cell string.

The source select transistor SST of each cell string is connected between the common source line CSL and memory cells MC1 to MCp.

In an embodiment, the source select transistors of cell strings arranged in the same row are coupled to a source select line extending in a row direction, and source select transistors of cell strings arranged in different rows are coupled to different source select lines. In FIG. 4, source select transistors of cell strings CS11 to CS1$m$ in a first row are coupled to a first source select line SSL1. The source select transistors of cell strings CS21 to CS2$m$ in a second row are coupled to a second source select line SSL2.

In an embodiment, source select transistors of the cell strings CS11 to CS1$m$ and CS21 to CS2$m$ may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are sequentially arranged in a direction opposite a positive (+) Z direction and are connected in series between the source select transistor SST and the pipe transistor PT. The p+1-th to nth memory cells MCp+1 to MCn are sequentially arranged in the +Z direction and are connected in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

A gate of the pipe transistor PT of each cell string is coupled to a pipeline PL.

The drain select transistor DST of each cell string is connected between the corresponding bit line and the memory cells MCp+1 to MCn. The cell strings in a row direction are coupled to drain select lines extending in a row direction. Drain select transistors of cell strings CS11 to CS1m in the first row are coupled to a first drain select line DSL1. Drain select transistors of cell strings CS21 to CS2m in a second row are coupled to a second drain select line DSL2.

Cell strings arranged in a column direction are coupled to bit lines extending in a column direction. In FIG. 4, cell strings CS11 and CS21 in a first column are coupled to a first bit line BL1. Cell strings CS1m and CS2m in an m-th column are coupled to an m-th bit line BLm.

The memory cells coupled to the same word line in cell strings arranged in a row direction constitute a single page. For example, memory cells coupled to the first word line WL1, among the cell strings CS11 to CS1m in the first row, constitute a single page. Memory cells coupled to the first word line WL1, among the cell strings CS21 to CS2m in the second row, constitute a single additional page. Cell strings arranged in the direction of a single row may be selected by selecting any one of the drain select lines DSL1 and DSL2. A single page may be selected from the selected cell strings by selecting any one of the word lines WL1 to WLn.

In an embodiment, even bit lines and odd bit lines, instead of first to m-th bit lines BL1 to BLm, may be provided. Further, even-numbered cell strings, among the cell strings CS11 to CS1m or CS21 to CS2m arranged in a row direction, may be coupled to the even bit lines, respectively, and odd-numbered cell strings, among the cell strings CS11 to CS1m or CS21 to CS2m arranged in the row direction, may be coupled to the odd bit lines, respectively.

In an embodiment, one or more of the first to n-th memory cells MC1 to MCn may be used as dummy memory cells. For example, one or more dummy memory cells are provided to reduce an electric field between the source select transistor SST and the memory cells MC1 to MCp. Alternatively, the one or more dummy memory cells are provided to reduce an electric field between the drain select transistor DST and the memory cells MCp+1 to MCn. As more dummy memory cells are provided, the reliability of the operation of the memory block BLKa is improved, but the size of the memory block BLKa is increased. As fewer memory cells are provided, the size of the memory block BLKa is reduced, but the reliability of the operation of the memory block BLKa may be deteriorated.

In order to efficiently control the one or more dummy memory cells, each of the dummy memory cells may have a required threshold voltage. Before or after the erase operation of the memory block BLKa is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have required threshold voltages.

Figure 5:
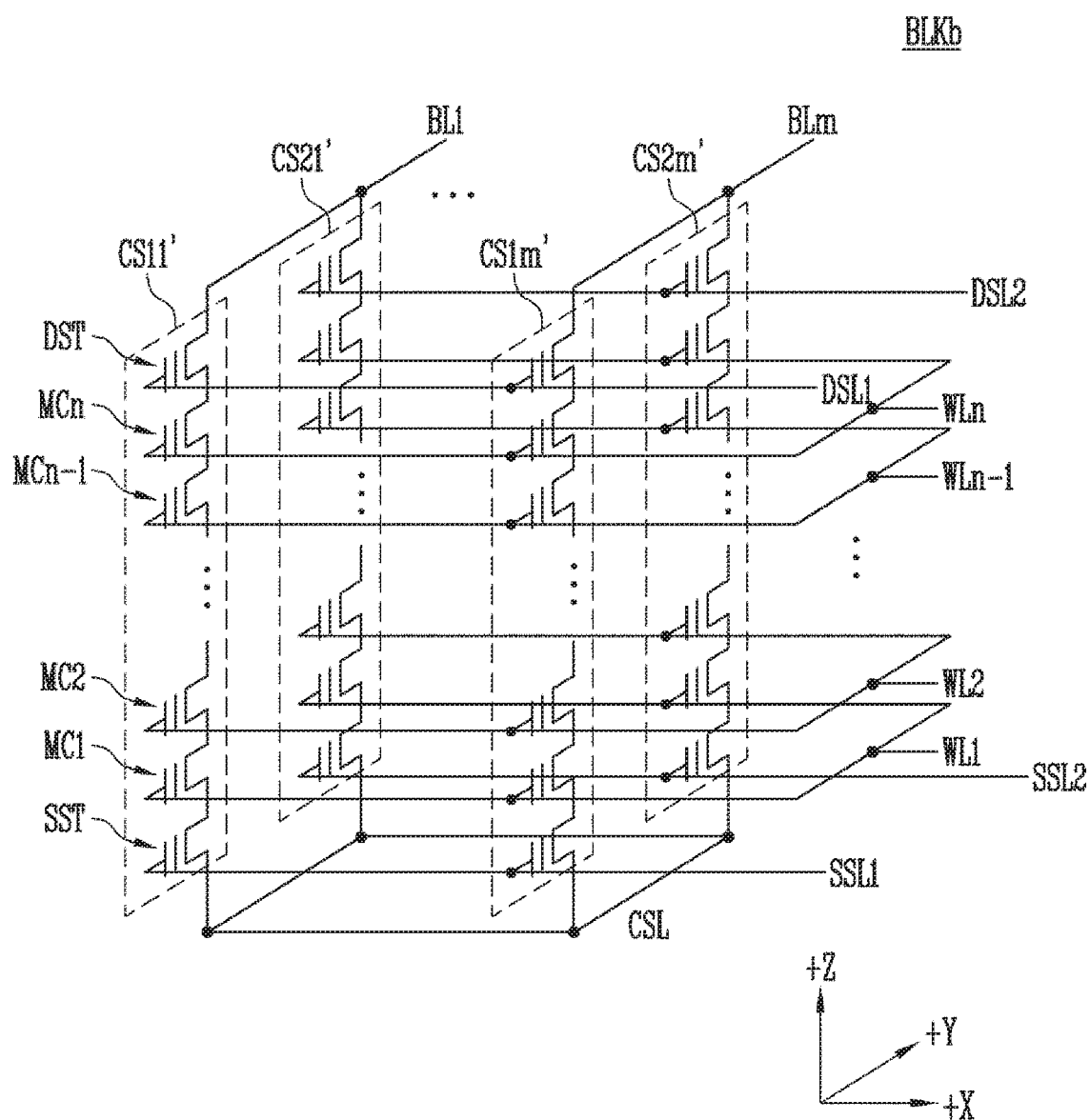
FIG. 5 is a circuit diagram illustrating an example of any one memory block BLKb of the memory blocks BLK1 to BLKz of FIG. 3.

FIG. 5 is a circuit diagram illustrating an example of any one memory block BLKb of the memory blocks BLK1 to BLKz of FIG. 3.

Referring to FIG. 5, the memory block BLKb includes a plurality of cell strings CS11' to CS1m' and CS21' to CS2m'. Each of the plurality of cell strings CS11' to CS1m' and CS21' to CS2m' extends in a positive Z (+Z) direction. Each of the cell strings CS11' to CS1m' and CS21' to CS2m' includes at least one source select transistor SST, first to nth memory cells MC1 to MCn, and at least one drain select transistor DST, which are stacked on a substrate (not illustrated) below the memory block BLKb.

The source select transistor SST of each cell string is connected between a common source line CSL and memory cells MC1 to MCn. The source select transistors of cell strings arranged in the same row are coupled to the same source select line. Source select transistors of cell strings CS11' to CS1m' arranged in a first row are coupled to a first source select line SSL1. Source select transistors of cell strings CS21' to CS2m' arranged in a second row are coupled to a second source select line SSL2. In an embodiment, source select transistors of the cell strings CS11' to CS1m' and CS21' to CS2m' may be coupled in common to a single source select line.

The first to nth memory cells MC1 to MCn in each cell string are connected in series between the source select transistor SST and the drain select transistor DST. The gates of the first to n-th memory cells MC1 to MCn are coupled to first to n-th word lines WL1 to WLn, respectively.

The drain select transistor DST of each cell string is connected between the corresponding bit line and the memory cells MC1 to MCn. Drain select transistors of cell strings arranged in a row direction are coupled to drain select lines extending in a row direction. The drain select transistors of the cell strings CS11' to CS1m' in the first row are coupled to a first drain select line DSL1. The drain select transistors of the cell strings CS21' to CS2m' in the second row are coupled to a second drain select line DSL2.

As a result, the memory block BLKb of FIG. 5 has a circuit similar to that of the memory block BLKa of FIG. 4. For example, the pipe transistor PT included in each cell string in the memory block BLKa of FIG. 4 is excluded from each cell string in the memory block BLKb of FIG. 5.

In an embodiment, even bit lines and odd bit lines, instead of first to m-th bit lines BL1 to BLm, may be provided. Further, even-numbered cell strings, among the cell strings CS11' to CS1m' or CS21' to CS2m' arranged in a row direction, may be coupled to the even bit lines, respectively, and odd-numbered cell strings, among the cell strings CS11' to CS1m' or CS21' to CS2m' arranged in the row direction, may be coupled to the odd bit lines, respectively.

In an embodiment, one or more of the first to n-th memory cells MC1 to MCn may be used as dummy memory cells. For example, the one or more dummy memory cells are provided to reduce an electric field between the source select transistor SST and the memory cells MC1 to MCn. Alternatively, the one or more dummy memory cells are provided to reduce an electric field between the drain select transistor DST and the memory cells MC1 to MCn. As more dummy memory cells are provided, the reliability of the operation of the memory block BLKb is improved, but the size of the memory block BLKb is increased. As fewer memory cells are provided, the size of the memory block BLKb is reduced, but the reliability of the operation of the memory block BLKb may be deteriorated.

In order to efficiently control the one or more dummy memory cells, each of the dummy memory cells may have a required threshold voltage. Before or after the erase operation of the memory block BLKb is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have required threshold voltages.

Figure 6:
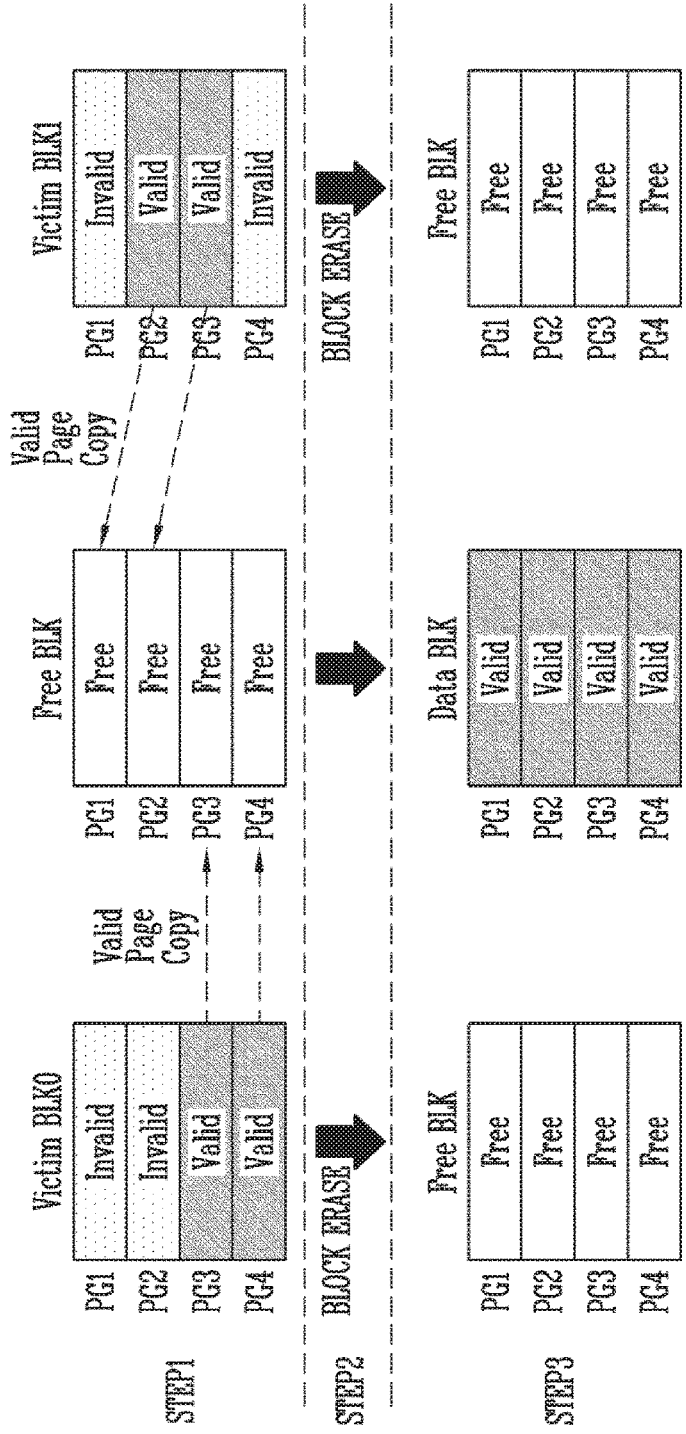
FIG. 6 is a diagram describing a garbage collection operation of a storage device.

FIG. 6 is a diagram describing a garbage collection operation of a storage device.

The garbage collection operation may be an operation performed to secure free blocks. Garbage collection may be the operation of copying valid data included in victim blocks to a free block and erasing the victim blocks.

Although in FIG. 6, for ease of description and illustration, a single memory block is illustrated as having four pages, that is, first to fourth pages PG1 to PG4, the embodiment of the present disclosure is not limited thereto.

Referring to FIG. 6, the garbage collection operation may be described through steps STEP1 to STEP 3.

At STEP1, block 0 (denoted as "Victim BLK0") and block 1 (denoted as "Victim BLK1") are selected as victim blocks. Methods of selecting victim blocks may be performed based on various types of criteria. For example, memory blocks in which the amount of stored valid data is less than or equal to a predetermined level may be selected as victim blocks. Alternatively, victim blocks may be selected using the ratio of valid data and invalid data that are stored. A first page (denoted as "PG1") and a second page (denoted as "PG2") in the block 0 BLK0 may be invalid pages in which invalid data is stored, and a third page (denoted as "PG3") and a fourth page (denoted as "PG4") in the block 0 BLK0 may be valid pages in which valid data is stored. A first page and a fourth page in the block 1 BLK1 may be invalid pages in which invalid data is stored, and a second page and a third page in the block 1 BLK1 may be valid pages in which valid data is stored. The memory controller may copy pieces of data stored in the valid pages of block 0 and block 1 to a free block, i.e., target block (denoted as "Free BLK"). A copy procedure may be performed using a method of reading data from corresponding valid pages and programming the read data to the free block.

At STEP2, the memory controller may perform an erase operation on block 0 and block 1. By the erase operation of the memory controller, all data stored in block 0 and block 1 may be erased.

At STEP3, block 0 and block 1 may be free blocks, and the target block, which was the free block at STEP1, may be a data block including valid data. Therefore, the number of free blocks (one) existing before the garbage collection operation is performed may be increased to two by the performance of the garbage collection operation.

Figure 7:
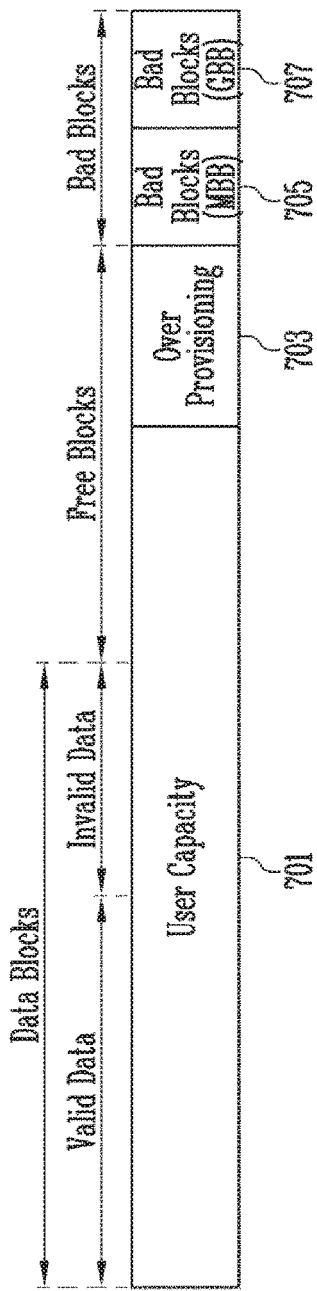
FIG. 7 is a diagram describing a change in the capacity of the storage device.

FIG. 7 is a diagram describing a change in the capacity of a storage device.

Referring to FIG. 7, the storage device 50 may include a memory device 100 having a plurality of memory blocks BLK1 to BLKz. In an embodiment, the storage device 50 may include one or more memory devices. The memory blocks BLK1 to BLKz stored in the storage device 50 may be classified into data blocks, free blocks, and bad blocks.

Each free block may be an empty block in which data is not stored. Each data block may be a block in which data is stored. The data stored in the data block may be divided into valid data and invalid data.

Bad blocks may be divided into a manufacture bad block (MBB) 705, which occurs when the memory device is manufactured, and a grown bad block (GBB) 707, which occurs in a procedure in which the corresponding memory block is used over time, depending on the time point at which each bad block occurs.

A user capacity 701, which is a capacity in which data may be stored by a user, may be the entire data storage capacity of the storage device, except the capacity of the bad blocks 705 and 707 and the capacity of an over-provisioning area 703. The over-provisioning area 703 may be a reserved area allocated to smoothly operate various functions required to drive the storage device, such as wear leveling and bad block management. Since the over-provisioning area 703 is an area inaccessible by the user, it is excluded from the user capacity 701.

In an embodiment, the over-provisioning area 703 may not change the size of its capacity. Therefore, the user capacity 701 may be increased or decreased depending on the number of bad blocks. In detail, the number of MBBs 705 may not change. However, the number of GBBs 707 may increase with the use of the storage device over time. As the number of GBBs 707 increases, the user capacity may decrease.

In an embodiment, when the sum of the number of memory blocks full of invalid data and the number of free blocks is decreased to a predetermined level or less, free blocks may not be secured even if the garbage collection operation is performed. In detail, when the number of invalid data blocks, which is a number obtained by dividing the size of invalid data by the capacity of a memory block, is equal to or greater than the number of free blocks, the number of free blocks may not change before and after the garbage collection operation is performed. Therefore, in this case, there is a need to suspend the performance of an unnecessary garbage collection operation.

Figure 8:
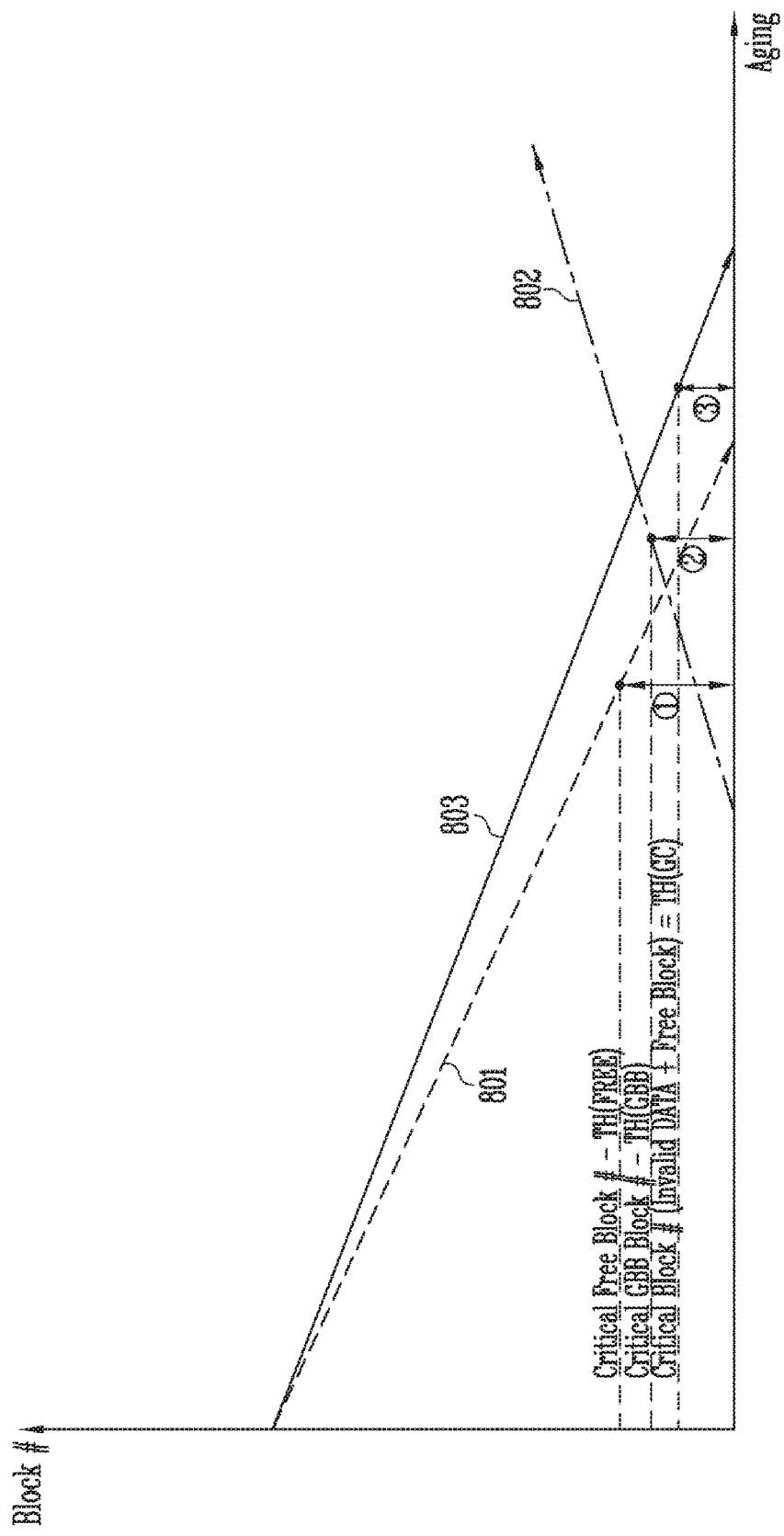
FIG. 8 is a diagram illustrating the operation of a garbage collection controller of FIG. 1.

FIG. 8 is a diagram illustrating the operation of the garbage collection controller 210 of FIG. 1.

Referring to FIG. 8, a horizontal axis denotes the aging of the storage device 50, and a vertical axis denotes the number of memory blocks.

A graph 801 indicated by a dotted line denotes the number of free blocks. The number of free blocks may be reduced as the storage device 50 is used. When the number of free blocks is decreased to less than the reference number of free blocks, the memory controller 200 may perform a garbage collection operation. However, when the number of free blocks is decreased to less than a first threshold value ① that is less than the reference number of free blocks, the storage device 50 may provide the host 300 with an urgent alarm signal indicating that it is time to secure a free blocks for storing data. That is, the first threshold value ① may be a criterion indicating a time point is approaching at which it is impossible to store additional data.

A graph 802 indicated by an alternate long and short dash line denotes the number of grown bad blocks (GBBs). The number of GBBs may increase as the storage device 50 is used over time. When the number of GBBs is greater than a second threshold value ②, the storage device 50 may provide the host 300 with a warning signal. The warning signal may be a signal indicating a situation in which it is difficult to maintain the user capacity 701 due to an increase in the number of GBBs.

A graph 803 indicated by a solid line denotes the number of blocks obtained by summing the number of invalid data blocks and the number of free blocks. The number of invalid data blocks may be a value obtained by dividing the size of invalid data included in the victim blocks by the capacity of a memory block. When the number of invalid data blocks is equal to or greater than the number of free blocks, the number of free blocks may not change before and after the garbage collection operation is performed. Therefore, when the number of blocks obtained by summing the number of invalid data blocks and the number of free blocks is decreased to less than a third threshold value ③, the storage device 50 may suspend the garbage collection operation. In an embodiment, the storage device 50 may be designated to perform only a read operation of reading stored data without further storing data. That is, the memory controller may set the storage device to a ROM The operations of the garbage collection controller 210 depending on a comparison between the first to third threshold values and the number of memory blocks are summarized in the following Table 1.

In detail, when the number of free blocks is decreased to less than the first threshold value, the garbage collection processor 211 may generate an urgent alarm signal and may provide the urgent alarm signal to the host 300. The urgent alarm signal may be a signal indicating that it is an time to secure a free block. Alternatively, the urgent alarm signal may be a signal indicating that a time point is approaching at which it is impossible to store additional data. In an embodiment, the first threshold value may be a value less than the reference number of free blocks, which is the number of free blocks for initiating a garbage collection operation.

When the number of GBBs included in the memory device 100 is greater than the second threshold value, a warning signal may be generated, and may then be provided to the host 300. The warning signal may be a signal indicating a situation in which it is difficult to maintain the user capacity 701 due to an increase in the number of GBBs. In an embodiment, the second threshold value may be the number of GBB which causes a decrease in the user capacity 701.

When the sum of the number of invalid data blocks and the number of free blocks is decreased to less than the third threshold value, the garbage collection controller 210 may

TABLE 1

| Less than third threshold value (③) | Greater than second threshold value (②) | Less than first threshold value (①) | ALARM | OPERATION | READ/WRITE |
|---|---|---|---|---|---|
| X | X | X | — | BACKGROUND GC | READ/WRITE |
| X | X | ○ | URGENT | FOREGROUND GC | READ/WRITE |
| X | ○ | X | WARNING | BACKGROUND GC | READ/WRITE |
| X | ○ | ○ | WARNING, URGENT | FOREGROUND GC | READ/WRITE |
| ○ | X | X | WARNING, URGENT | RECLAIM | READ ONLY |
| ○ | X | ○ | WARNING, URGENT | RECLAIM | READ ONLY |
| ○ | ○ | X | WARNING, URGENT | RECLAIM | READ ONLY |
| ○ | ○ | ○ | WARNING, URGENT | RECLAIM | READ ONLY |

Figure 9:
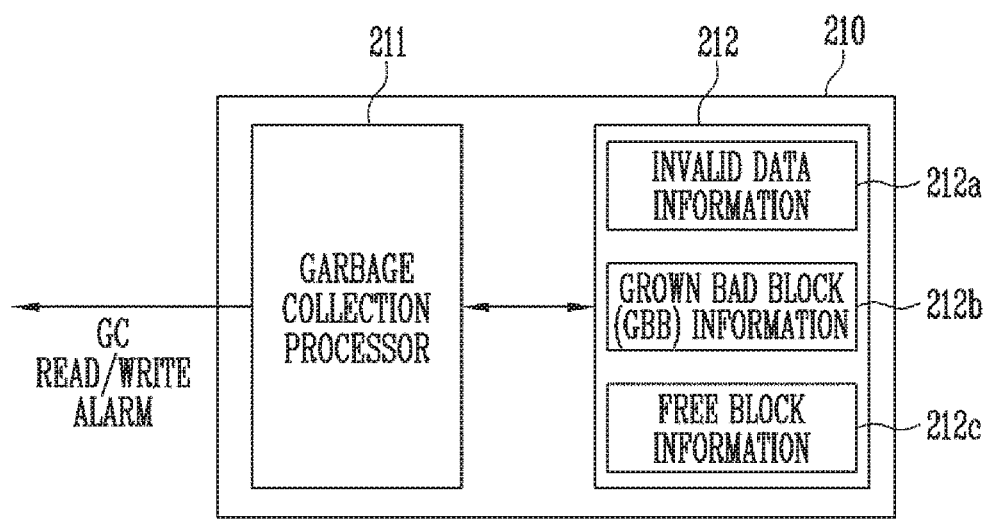
FIG. 9 is a block diagram illustrating the structure of the garbage collection controller of FIG. 1.

FIG. 9 is a block diagram illustrating the structure of the garbage collection controller 210 of FIG. 1.

Referring to FIG. 9, the garbage collection controller 210 may include a garbage collection processor 211 and a garbage collection information storage 212.

The garbage collection processor 211 may control a garbage collection operation. In detail, the garbage collection processor 211 may control the garbage collection operation based on garbage collection-related information stored in the garbage collection information storage 212.

For example, the garbage collection processor 211 may control whether to perform a garbage collection operation (GC) depending on the states of memory blocks. Alternatively, the garbage collection processor 211 may control whether to perform a write operation of storing data in a memory block and a read operation of reading data from a memory block depending on the states of memory blocks. Alternatively, the garbage collection processor 211 may provide an alarm signal ALARM (denoted as "GC READ/WRITE ALARM") to the host 300 depending on the states of the memory blocks.

suspend the garbage collection operation. Alternatively, when the sum of the number of invalid data blocks and the number of free blocks is decreased to less than the third threshold value, the garbage collection controller 210 may set the storage device so that the storage device performs only a read operation without further performing a write operation on memory blocks. That is, when the sum of the number of invalid data blocks and the number of free blocks is decreased to less than the third threshold value, the storage device may be operated as a read only memory (ROM). In an embodiment, the third threshold value may be the sum of the number of invalid data blocks and the number of free blocks in a state in which the number of free blocks does not change even if the garbage collection operation is performed.

The garbage collection information storage 212 may store garbage collection-related information. In detail, the garbage collection-related information may include invalid data information 212a, grown bad block (GBB) information 212b, and free block information 212c.

The invalid data information 212a may include information about the number of invalid data blocks. The number of invalid data blocks may be a value obtained by dividing the size of invalid data stored in data blocks by the size of a memory block. In an embodiment, the number of invalid data blocks may be a value obtained by dividing the size of invalid data stored in victim blocks, among data blocks, by the size of a memory block.

The GBB information 212b may be information about grown bad blocks (GBB). In an embodiment, the GBB information 212b may include information about the number of GBBs. Such a GBB may be a memory block in which an uncorrectable error (i.e. uncorrectable ECC, UECC) occurs when memory blocks in which data is stored are read. The number of GBBs may increase as the storage device 50 is used over time.

The free block information 212c may be information about free blocks. In an embodiment, the free block information 212c may include information about the number of free blocks.

Figure 10:
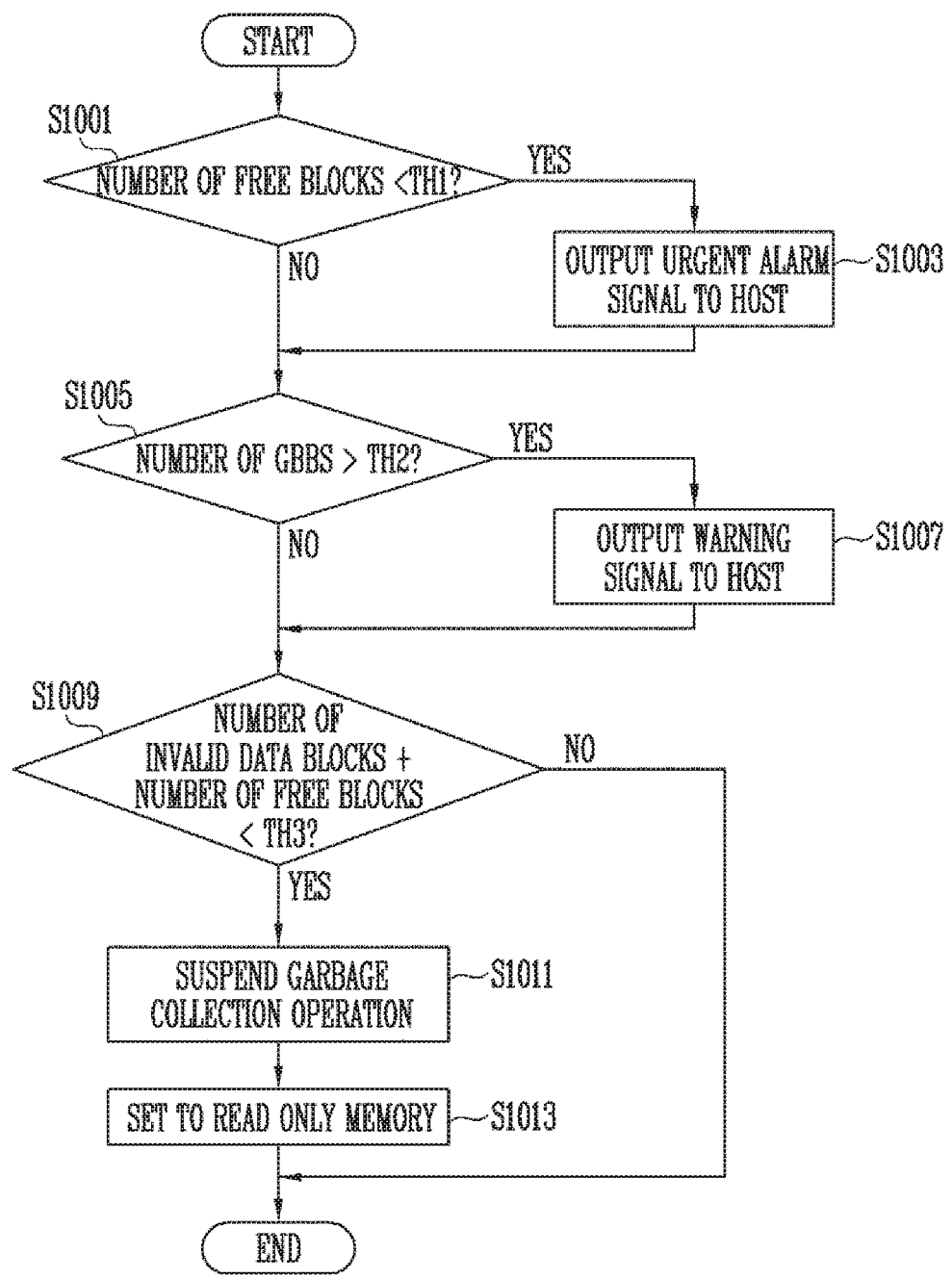
FIG. 10 is a flowchart describing a method of operating a memory controller according to an embodiment of the present disclosure.

FIG. 10 is a flowchart describing the operation of the memory controller 200 according to an embodiment of the present disclosure.

Referring to FIG. 10, at step S1001, the memory controller 200 may determine whether the number of free blocks is less than the first threshold value. When it is determined that the number of free blocks is less than the first threshold value (that is, "YES" at step S1001), the process proceeds to step S1003. When it is determined that the number of free blocks is not less than the first threshold value (that is, "NO" at step S1001), the process proceeds to step S1005.

At step S1003, the memory controller may generate an urgent alarm signal and may provide the urgent alarm signal to the host 300. The urgent alarm signal may be a signal indicating that it is a time to secure a free block. Alternatively, the urgent alarm signal may be a signal indicating a time point is approaching at which it is impossible to store additional data. In an embodiment, the first threshold value may be a value less than the reference number of free blocks, which is the number of free blocks for initiating a garbage collection operation.

At step S1005, when it is determined that the number of free blocks is not less than the first threshold value, the memory controller 200 may determine whether the number of GBBs is greater than the second threshold value. Such a GBB may be a memory block in which an uncorrectable error (i.e. uncorrectable ECC, UECC) occurs when memory blocks in which data is stored are read. The number of GBBs may increase as the storage device is used over time. When it is determined that the number of GBBs is greater than the second threshold value (that s, "YES" at step S1005), the process proceeds to step S1007. When it is determined that the number of GBBs is not greater than the second threshold value (that is, "NO" at step S1005), the process proceeds to step S1009.

At step S1007, the memory controller 200 may generate a warning signal and may provide the warning signal to the host 300. The warning signal may be a signal indicating a situation in which it is difficult to maintain the user capacity due to an increase in the number of GBBs. In an embodiment, the second threshold value may be the number of GBB which causes a decrease in the user capacity.

At step S1009, when it is determined that the number of GBBs is not greater than the second threshold value, the memory controller 200 may determine whether the sum of the number of invalid data blocks and the number of free blocks is less than the third threshold value. When it is determined that the sum of the number of invalid data blocks and the number of free blocks is less than the third threshold value (that is, "YES" at step S1009), the process proceeds to step S1011. When it is determined that the sum of the number of invalid data blocks and the number of free blocks is not less than the third threshold value (that is, "NO" at step S1009), the process may be terminated. In an embodiment, the third threshold value may be the sum of the number of invalid data blocks and the number of free blocks in a state in which the number of free blocks does not change even if the garbage collection operation is performed.

At step S1011, the memory controller 200 may suspend the garbage collection operation.

At step S1013, the memory controller 200 may set the storage device 50 so that the storage device 50 performs only a read operation without further performing a write operation on the memory blocks. That is, the memory controller 200 may set the storage device 50 to a ROM.

Figure 11:
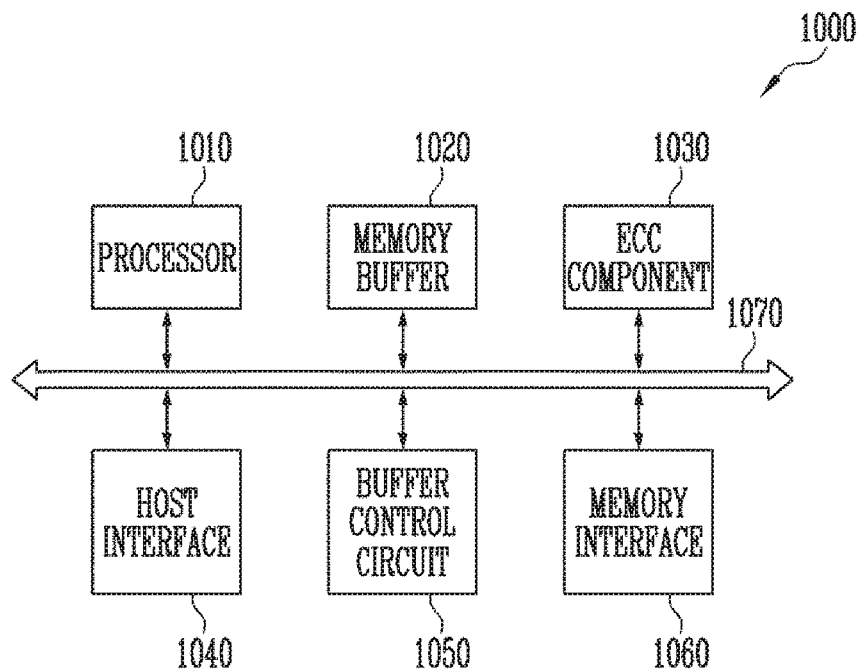
FIG. 11 is a diagram illustrating an embodiment of a memory controller of FIG. 1.

FIG. 11 is a diagram illustrating an example of the memory controller 200 of FIG. 1.

A memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

Referring to FIG. 11, the memory controller 1000 may include a processor 1010, a memory buffer 1020, an error checking and correction (ECC) component 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor may derandomize data received from the memory device during a read operation. For example, the processor 1010 may derandomize the data received from the memory device using a derandomizing seed. The derandomized data may be output to the host.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC component 1030 may perform error correction. The ECC component 1030 may perform error correction code (ECC) encoding based on data to be written to the memory device through the memory interface 1060. The ECC-encoded data may be transferred to the memory device through the memory interface 1060. The ECC component 1030 may perform ECC decoding based on data received from the memory device through the memory interface 1060. In an example, the ECC component 1030 may be included as the component of the memory interface 1060 in the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, and may neither interfere with each other nor influence each other. The data bus may be coupled to the host interface 1040, the buffer control circuit 1050, the ECC component 1030, and the memory interface 1060. The control bus may be coupled to the host interface 1040, the processor 1010, the buffer control circuit 1050, the memory buffer 1020, and the memory interface 1060.

Figure 12:
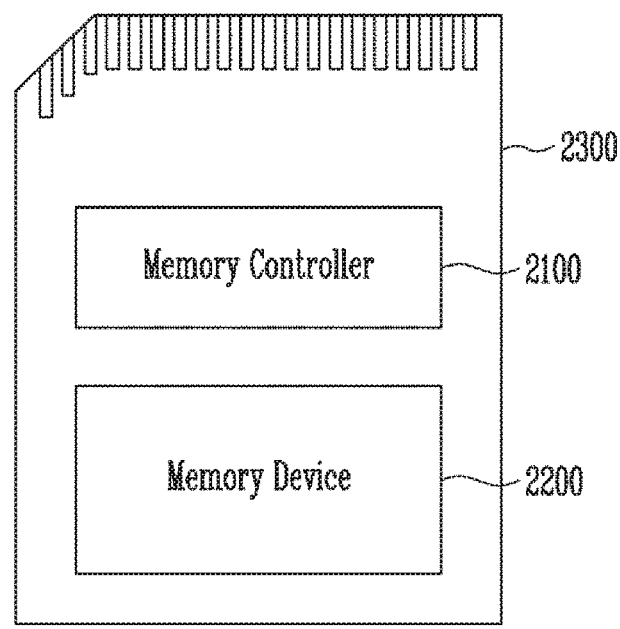
FIG. 12 is a block diagram illustrating a memory card system to which the storage device according to an embodiment of the present disclosure is applied.

FIG. 12 is a block diagram illustrating a memory card system to which the storage device according to an embodiment of the present disclosure is applied.

Referring to FIG. 12, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may be control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same way as the memory controller 200 described above with reference to FIG. 1.

In an embodiment, the memory controller 2100 may include components, such as a RAM, a processor, a host interface, a memory interface, and an ECC component.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), a Spin-Torque Magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 13:
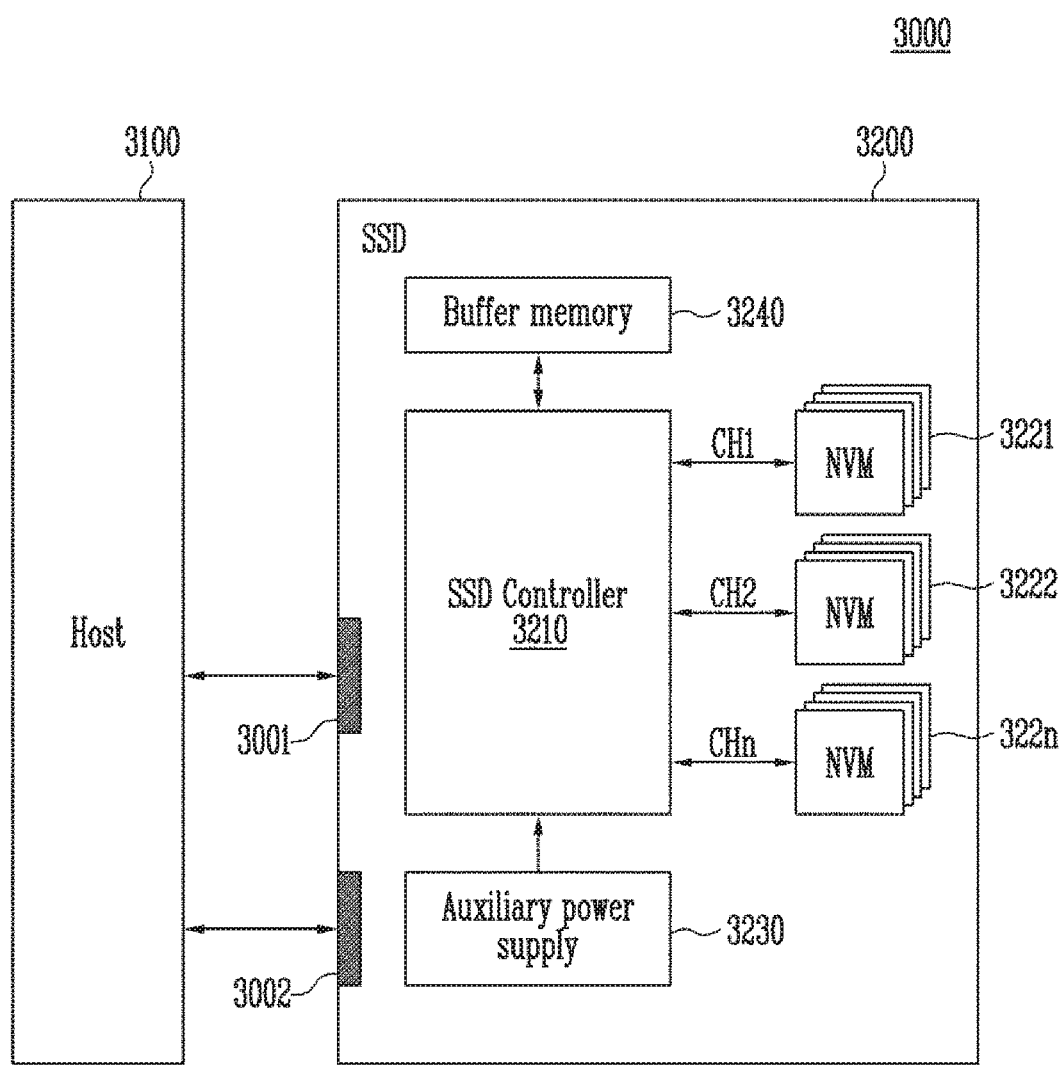
FIG. 13 is a block diagram illustrating an example of a solid state drive (SSD) system to which the storage device according to an embodiment of the present disclosure is applied.

FIG. 13 is a block diagram illustrating an example of a solid state drive (SSD) system to which the storage device according to an embodiment of the present disclosure is applied.

Referring to FIG. 13, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, I-MRAM, and PRAM.

Figure 14:
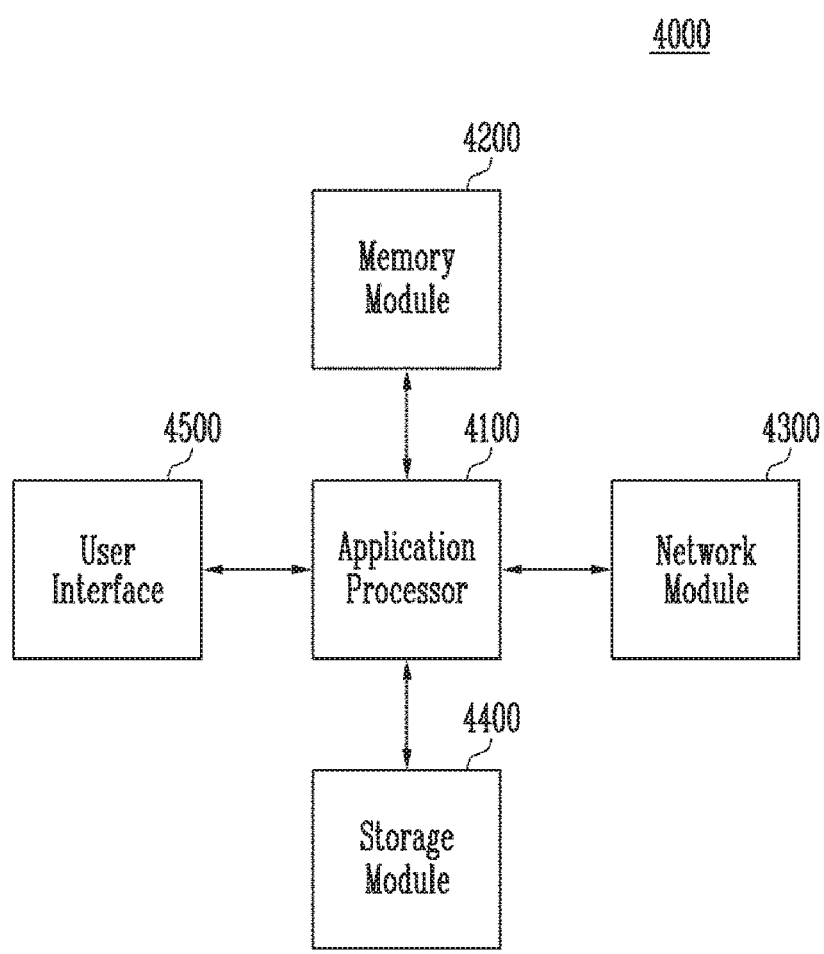
FIG. 14 is a block diagram illustrating a user system to which the storage device according to an embodiment of the present disclosure is applied.

FIG. 14 is a block diagram illustrating a user system to which the storage device according to an embodiment of the present disclosure is applied.

Referring to FIG. 14, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 400.

In an embodiment, the storage module 4400 may include a plurality of nonvolatile memory devices, each of which may be operated in the same way as the memory device described above with reference to FIGS. 2 to 5. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

There are provided a storage device, which performs an improved garbage collection operation, and a method of operating the storage device.

While the exemplary embodiments of the present disclosure have been disclosed for illustrative purposes, those skilled in the art will appreciate that various modifications, additions and substitutions are possible. Therefore, the scope of the present disclosure must be defined by the appended claims and equivalents of the claims rather than by the description preceding them.

Although the embodiments of the present disclosure have been disclosed, those skilled in the art will appreciate that various modifications, additions and substitutions are possible, without departing from the scope and spirit of the present disclosure.

Therefore, the scope of the present disclosure must be defined by the appended claims and equivalents of the claims rather than by the description preceding them.

In the above-discussed embodiments, all steps may be selectively performed or skipped. In addition, the steps in each embodiment may not always be sequentially performed in given order, and may be randomly performed. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A storage device, comprising:
a memory device including a plurality of memory blocks; and
a memory controller configured to control the memory device and perform a garbage collection operation, based on a sum of a number of invalid data blocks and a number of free blocks, among the plurality of memory blocks,
wherein the number of invalid data blocks is determined depending on a size of invalid data stored in the plurality of memory blocks.

2. The storage device according to claim 1, wherein the memory controller comprises:
a garbage collection processor configured to compare the sum of the number of invalid data blocks and the number of free blocks with a preset threshold value, and then determine whether to perform the garbage collection operation according to the comparison; and
a garbage collection information storage configured to store information about the invalid data and information about the number of free blocks.

3. The storage device according to claim 2, wherein the garbage collection processor is configured to perform, in response to the number of free blocks, being less than a reference number of free blocks, the garbage collection operation.

4. The storage device according to claim 3, wherein the threshold value is a value less than the reference number of free blocks.

5. The storage device according to claim 3, wherein the threshold value is the sum of the number of invalid data blocks and the number of free blocks causing the number of free blocks not to change even if the garbage collection operation is performed.

6. The storage device according to claim 2, wherein the garbage collection processor is configured to, in response to the sum of the number of invalid data blocks and the number of free blocks, being less than the threshold value, suspend the garbage collection operation.

7. The storage device according to claim 2, wherein the garbage collection processor is configured to, in response to the sum of the number of invalid data blocks and the number of free blocks, being less than the threshold value, set the storage device to a read only memory (ROM).

8. The storage device according to claim 2, wherein the garbage collection information storage is configured to further store information about grown bad blocks that are bad blocks occurring as the memory device is used, among the plurality of memory blocks.

9. The storage device according to claim 1, wherein the number of invalid data blocks is a value obtained by dividing a size of the invalid data by a size of any one of the plurality of memory blocks.

10. A storage device, comprising:
a memory device including a plurality of memory blocks; and
a memory controller configured to provide an alarm signal to an external host depending on any one of a number of free blocks in which data is not stored and a number of grown bad blocks that are bad blocks occurring as the memory device is used, among the memory blocks,
wherein the memory controller is further configured to perform a garbage collection operation, based on a sum of a number of invalid data blocks and the number of free blocks among the plurality of memory blocks, and
wherein the number of invalid data blocks is determined depending on a size of invalid data stored in the plurality of memory blocks.

11. The storage device according to claim 10, wherein the memory controller comprises:
a garbage collection processor configured to determine whether to generate the alarm signal depending on the number of free blocks or the number of grown bad blocks; and
a garbage collection information storage configured to store information about the number of free blocks and information about the grown bad blocks.

12. The storage device according to claim 11, wherein the garbage collection processor is configured to generate, in response to the number of free blocks, being less than a preset first threshold value, an urgent alarm signal indicating that it is time to secure the free blocks.

13. The storage device according to claim 12, wherein the first threshold value is a value less than a reference number of free blocks indicating the number of free blocks for initiating the garbage collection operation.

14. The storage device according to claim 11, wherein the garbage collection processor is configured to generate, in response to the number of grown bad blocks, being greater than a preset second threshold value, a warning signal indicating a situation in which it is difficult to maintain an available storage capacity in the storage device.

15. The storage device according to claim 14, wherein the second threshold value is the number of grown bad blocks causing a decrease in the user capacity.

16. The storage device according to claim 11, wherein the grown bad blocks are memory blocks in which an uncorrectable error occurs in response to data being read, among the plurality of memory blocks.

17. The storage device according to claim 11, wherein the number of grown bad blocks increases as the storage device is used.

18. A method of operating a memory controller, the memory controller controlling a memory device including a plurality of memory blocks, the method comprising:
performing, based on a sum of a number of invalid data blocks and a number of free blocks in which data is not stored, among the plurality of memory blocks, a garbage collection operation; and
outputting, in response to the number of free blocks, being less than a first threshold value, an urgent alarm signal indicating that it is a time to secure the free blocks,
wherein the number of invalid data blocks is determined depending on a size of invalid data stored in the plurality of memory blocks.

19. The method according to claim 18, further comprising outputting, in response to a number of grown bad blocks that are bad blocks occurring as the memory device is used, being greater than a second threshold value, a warning signal indicating a situation in which it is difficult to maintain an available capacity in the memory device.

20. The method according to claim 18, further comprising suspending, in response to the sum of the number of invalid data blocks, set depending on the size of the invalid data stored in the plurality of memory blocks, and the number of free blocks, being less than a third threshold value, the garbage collection operation.

* * * * *